United States Patent
Flanagan

(12) 
(10) Patent No.: US 6,853,715 B2
(45) Date of Patent: Feb. 8, 2005

(54) PROVISIONING OF SUBSCRIBER SERVICES

(75) Inventor: Thomas F. Flanagan, Springfield, VA (US)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 09/897,519

(22) Filed: Jul. 2, 2001

(65) Prior Publication Data

US 2002/0037075 A1 Mar. 28, 2002

Related U.S. Application Data

(60) Provisional application No. 60/216,342, filed on Jul. 5, 2000.

(51) Int. Cl.[7] ........................ H04M 3/42; H04M 15/00
(52) U.S. Cl. ..................... 379/201.12; 379/114.05
(58) Field of Search .......... 379/201.12, 201.01–201.04, 379/210.02, 211.01, 114.01, 114.27, 115.01, 114.03, 114.05; 709/203, 217, 218

(56) References Cited

U.S. PATENT DOCUMENTS

| | | | |
|---|---|---|---|
| 5,440,620 A | 8/1995 | Slusky | ........................ 379/100 |
| 6,016,307 A | 1/2000 | Kaplan et al. | ............... 370/238 |
| 6,028,917 A | 2/2000 | Creamer et al. | ........ 379/100.01 |
| 6,115,737 A | * 9/2000 | Ely et al. | ..................... 709/203 |

OTHER PUBLICATIONS

Broadsoft, White Paper, Service Creation. com, pp. 1–11, www.broadsoft.com.

Broadsoft, White Paper, Messaging, Service Creation, and Enhanced Services, pp. 1–11, www.broadsoft.com.

* cited by examiner

*Primary Examiner*—Benny Tieu
(74) *Attorney, Agent, or Firm*—Abdul Zindani; W. James Brady; Frederick J. Telecky, Jr.

(57) ABSTRACT

A system for provisioning of enhanced telephone services by the subscriber is provided for a base telephone account. The system allows enhanced services that are recorded to a subscriber's base telephone data block at the PSTN provider to be configured based on time of day, week, or any user identified formula. Enhanced services include multiple telephone lines, voice mail, call waiting, and access to special lines. By provisioning services, a subscriber can pay prorated charges for only those services during the designated time span of activation.

20 Claims, 3 Drawing Sheets

PROVISIONING OF SUBSCRIBER SERVICES

CROSS-REFERENCE TO RELATED APPLICATIONS

This application claims the benefit under 35 U.S.C. § 119 of provisional application Ser. No. 60/216,342, filed Jul. 5, 2000, entitled "Provisioning of Subscriber Services," which, is incorporated herein by reference.

BACKGROUND OF THE INVENTION

A variety of features known as enhanced subscriber services are available from a local telephone company to increase the usefulness of a telephone to subscribers. These features include multiple phone lines, distinctive ringing, speed calling, call waiting, caller ID, call forwarding, etc. Special services, such as custom features for individual telephone subscribers, are also becoming increasingly prevalent and increasingly important in the modern generation of program controlled switching systems. Such custom features include abbreviated dialing lists, allowance of access to a toll network, allowance of access to special private lines, special billing, allowance of access to services provided by intelligent peripherals, and allowance of access to intelligent networks. On a standard telephone serviced through the public switched telephone network (PSTN), data describing these features are recorded in a feature data block associated with the subscriber's base telephone account in the telephone exchange to which the subscriber's base telephone is connected.

A base telephone line or port account is an account assigned to a specific customer of the PSTN; an example of such an account would be an account to which telephone calls associated with a specific telephone line are charged. The PSTN is the aggregate of all instrumentalities providing and managing telephone call connections between members of the public at large, but excluding instrumentalities that are restricted to special groups of users; e.g. PBX's, Centrix's, etc. The local exchange consults the recorded data to determine what service features should be provided to calls originating from and terminating on the subscriber's base telephone account For enhanced services managed by a local PSTN provider, the base telephone port is charged for all services invoked in the name of the that port. An authorized user, or subscriber, may change the services by dialing a customer service operator for the local telephone company and communicating whether the enhanced features and services should be modified, if applicable, subscribed to, or unsubscribed from the terminal port account. An authorized user of a home base telephone is either a customer to whom the account is charged or a party authorized by the customer to use and modify telephone services to which the account is subscribed. For subscribing to individual or blocks of features, the local telephone service providing calls on a standard telephone line through the PSTN typically charges surcharge fees for each adding service and charges a subscriber a flat monthly fee for subscribing to each service. A standard telephone service is a telephone service delivered to end users of telephone services through communication routes entirely internal to the PSTN.

Internet phones are currently entering the market, making it possible to talk to one or more remote parties over the Internet A subscriber can use a personal computer (PC) or a service provider's custom-built Internet telephone and associated computer to call anyone through the Internet either fully through the Internet or in an Internet-to-PSTN configuration. PSTNs and private carriers have also installed Internet telephony servers to route telephone calls over data networks, such as the Internet. The technology offers cost-effective alternatives to traditional long distance calling. It also offers enhanced subscriber services similar to a traditional telephone. User use of an IP network for telephony could even be mandated through customer programming of PBX networking features. While in the past proprietary solutions prevented some Internet phones from communicating between users having different software, the emergence of H.323 standard has provided a foundation for audio, video, and data communications across IP based networks, such as the Internet. Enhanced, or extended, telephone services are also available for Internet telephone subscribers. Enhanced services may be combined between the two different systems, inside the PSTN network and outside the PSTN through an IP network.

The problem with current subscriber systems is that no provision is made in the system for the subscriber to modify services and phone numbers associated with a base telephone port account for only certain time intervals, or on a repeated allocation of time as the services are needed. Services must typically be either fully subscribed to or fully unsubscribed. No provision is made for part-time subscription and part-time billing of enhanced services. Many subscribers only need services on a part-time basis but must pay for a full-time subscription, therefor paying for services they do not need.

SUMMARY OF THE INVENTION

The problems of prior art systems are overcome and a technical advance is achieved in accordance with the principals of this invention by means of the provisioning of services by the subscriber to the service rather than, or in conjunction with, the service provider. In today's PSTN, authorized users of a home base telephone have limited options for varying and utilizing enhanced services. The present invention provides for configuring the allocation and delivery of standard and enhanced telephone services directly through a network, such as the Internet, based upon the needs of the subscriber rather than an allocation by the service provider.

The new invention allows enhanced services that are recorded to a subscriber's base telephone data block at the PSTN provider to be configured based on time of day, week, or other parameters such as user identification. Enhanced services include distinctive ringing, call waiting, caller ID, conference calling, allowance of access to a toll network, allowance of access to special private lines, special billing, allowance of access to services provided by intelligent peripherals and networks. More standard service subscriptions features that may be provisionally changed include multiple phone numbers and change of phone number at a subscriber's base telephone.

Provisioning of services by the subscriber is provided for either a standard base telephone account or an Internet phone account, if the Internet account is managed through a service provider. A subscriber's configuration of enhanced services usually tied to the particular telephone customer's terminal port on a switching system by means of a static block of information provided for the customer served by that terminal port. In the present invention, a customer may access the data contained in the static block of subscriber information held by the local PSTN through either the provider's system directly or an Internet connection, such as a voice enabled residential gateway, cable modem, or xDSL.

The subscriber may access a matrix switch that can receive digital commands and execute the subscriber's desired configuration to the PSTN system. The matrix switch also links to a billing server that records and charges for services based upon allocation of use.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
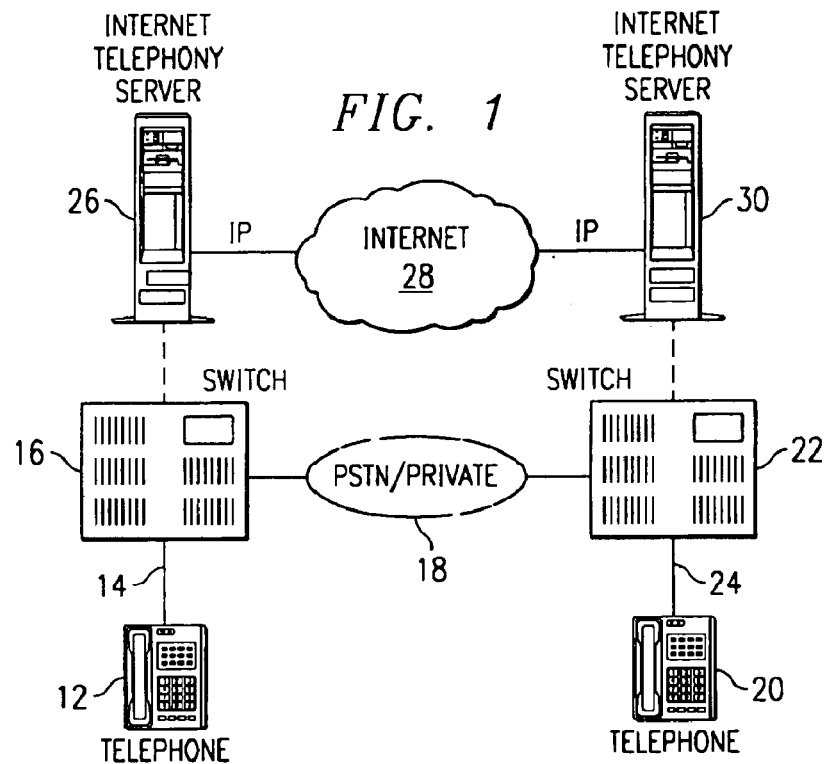
FIG. 1 is a schematic of the interconnection of a base telephone to the PSTN or the Internet.

Referring to the several illustrations represented in the figures, there is depicted in FIG. 1 a schematic of two methods of placing a telephone call using either the Internet or the PSTN to route a telephone call. A user initiates a telephone call from a line 12 associated with a base telephone account. Hereinafter, a telephone line such as that used by an authorized user of the base telephone account is referred to as a base, telephone line or port. A base telephone line typically connects to analog telephone equipment at one end and PSTN at its other end. As shown in FIG. 1, a line 14 connects to a switch 16 which is illustrative of numerous switches and routers between a local telephone company and a base telephone. The line 14 may be a telephone line maintained by the PSTN 18 or part of a private network external to the PSTN, such as one connecting to a local or wide area network. The initiating analog base telephone 12 may connect to another similar phone 20 through the PSTN 18, or a similar private network, through its associated switches 22 and lines 24 at the receiving end 20.

An alternative method for placing a telephone call is routing a digital call through the Internet. The Internet call may be placed over a telephone service company's Internet telephony server 26 on the initiating end, through the Internet 28, and routed through a second Internet telephony server 30 on the receiving end, where it is directed to the appropriate receiving telephone 20.

Figure 2:
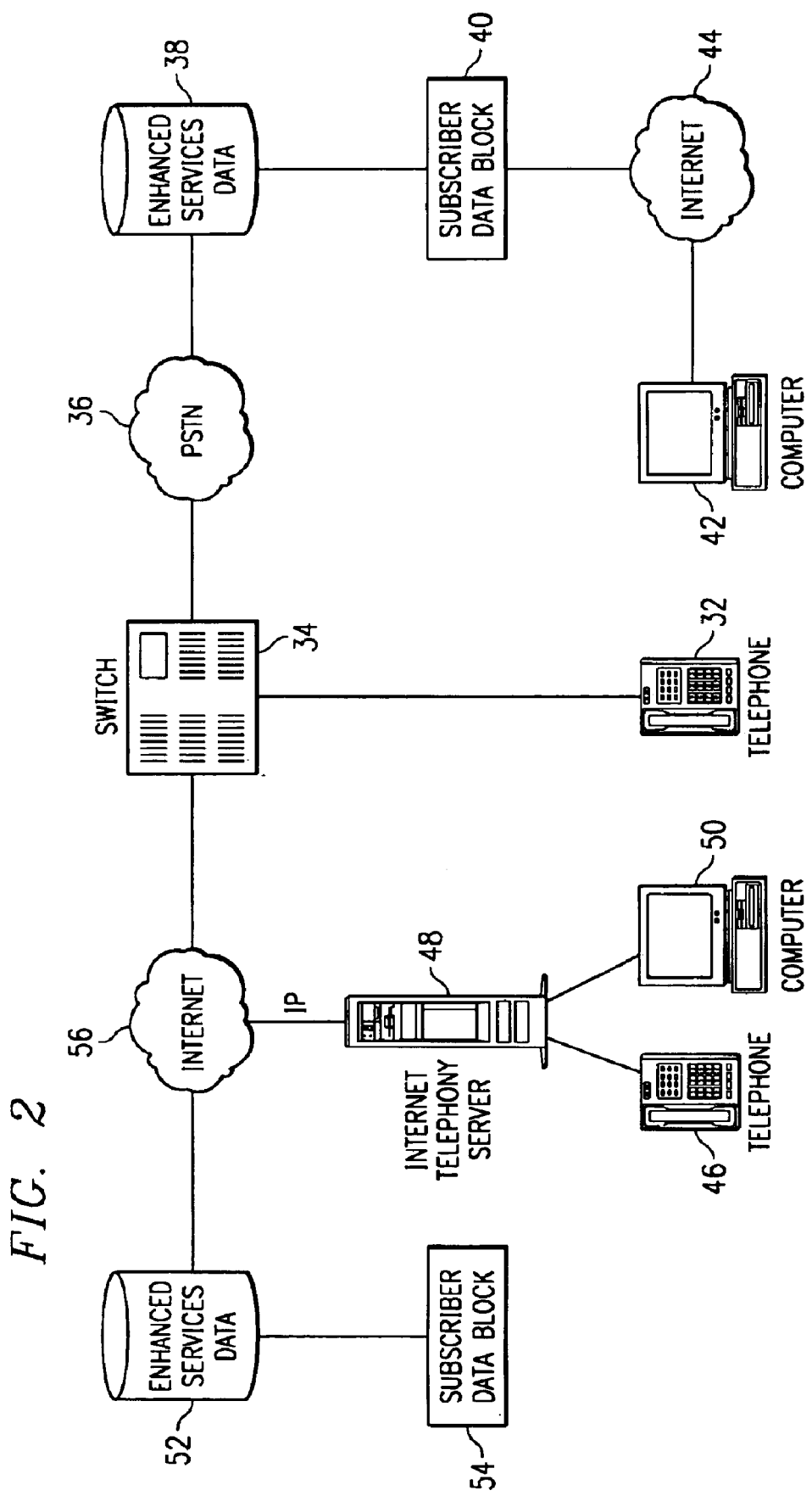
FIG. 2 is schematic of a preferred system environment for implementation of the present invention.

FIG. 2 illustrates resource management of the PSTN and Internet telephony servers, configured in accordance with the distributed architecture. System complexes embodying such systems are located at either the central office or regional nodes of the PSTN. Each nodal complex comprises a network of computers and switching gear configured with architectural principles of Advanced Intelligent Network (AIN) construction that have been widely adopted by telephone companies within the PSTN. The operations described herein usually will be performed at a regional node of the PSTN that locally maintains the base telephone account of the party receiving enhanced services.

The subscriber's enhanced services may be delivered either conditionally or subject to conditions stipulated by the subscriber. Standard telephone service with a base telephone port 32 is routed through a switch 34 and through the PSTN 36. A database 38 containing configurations for a subscriber's enhanced services is located on a server maintained by the local telephone service company that maintains the base telephone account. A subscriber's data block 40 contains records for a specific subscriber regarding which services the subscriber has selected for use for a specific base telephone account. Access to the subscriber data block by a subscriber may either be through a customer service representative at the local telephone company or directly from a computer 42 through the Internet 44. If a subscriber is using a digital telephone system 46 or computer 48 to place a call through an Internet server managing the system 50, the enhanced services database 52 and a subscriber's data block 54 may also be accessed directly through the Internet 56.

Figure 3:
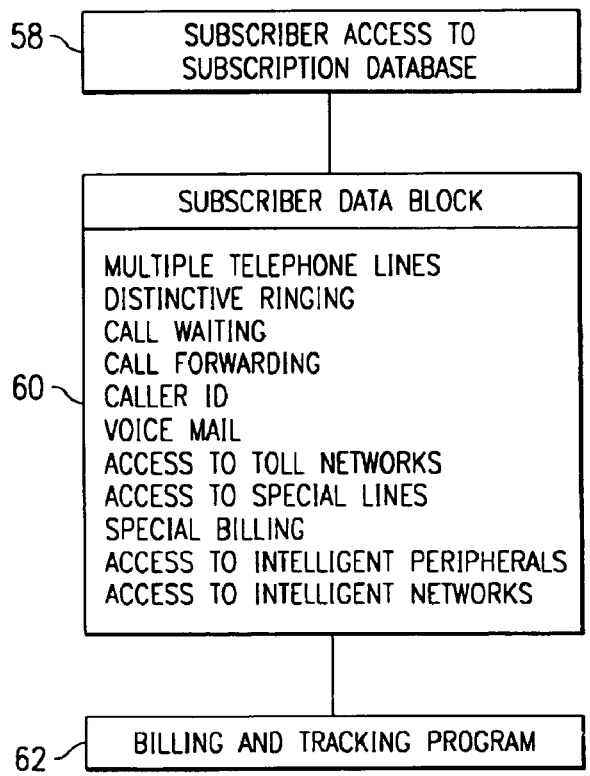
FIGS. 3 through 5 are exemplary logic flow diagrams of the method of implementation of the present invention.

The blocks in FIG. 3 illustrate information located in a data block that may be accessed by a subscriber 58. This list is meant to be illustrative and not limiting in any manner. Enhanced services 60 include changing telephone numbers, call forwarding, distinctive ringing, call waiting, caller ID, access to toll networks, access to special lines, special billing, access to intelligent peripherals, and access to intelligent networks. The services are linked to a billing program to track charges assessed towards the base telephone account 62. The services illustrated in FIG. 3 are delivered solely within the PSTN for a base telephone account. The services are modifiable only by authorized subscribers of the base telephone account either through the Internet or through customer service.

Figure 4:
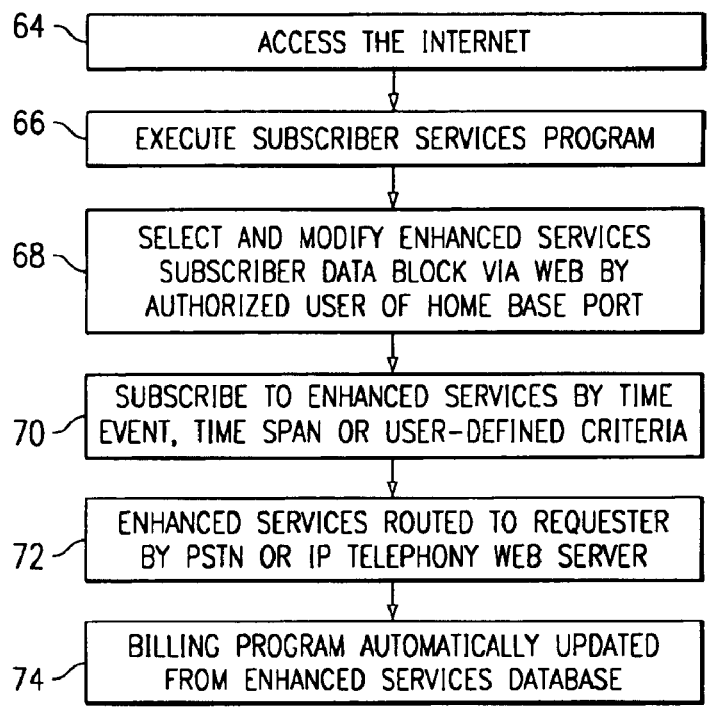

The presently contemplated adaptation of this system provides modified subscription and accounting of telephone services. The enhanced services data block can be functionally adapted to provide particular enhanced services that are provisioned by the subscriber instead of the service provider. FIG. 4 illustrates how the provisioning of enhanced services menu may be accessed and modified. Block 64 indicates that a subscriber accesses the Internet through an Internet service provider (ISP), residential Internet gateway, cable modem, or xDSL modem. The subscriber then executes a services subscription program 66. This program may either reside on the subscriber's computer or more advantageously on the telephone company's Internet Web server. It is assumed for the purposes of this discussion that the access program is allowed for an authorized subscriber only and the program provides appropriate security software and hardware to manage the system. Block 68 indicates that with the system described herein, a subscriber may select and modify the enhanced services data block. The services are provisioned on an as-needed basis 70. For example, a subscriber traveling on a vacation does not use nor need all the enhanced services available for the base telephone account. While the subscriber and any additional users are absent from the home containing the base telephone line, only basic telephone service and voice mail may be desired for the account. However, the subscriber is being charged a per-use or monthly fee for all of the subscribed services. By provisioning of services as needed, the subscriber can turn off certain services during the dates the subscriber will be away. The enhanced services commands are sent from the Web page program to the enhanced services database and associated service peripherals 72. The billing system for the enhanced services will likewise prorate the charges for services each billing cycle for only those times when the services were subscribed to by the subscriber 74. In effect, the enhanced service is provisioned in delivery and charges are prorated in charges to the subscriber.

Figure 5:
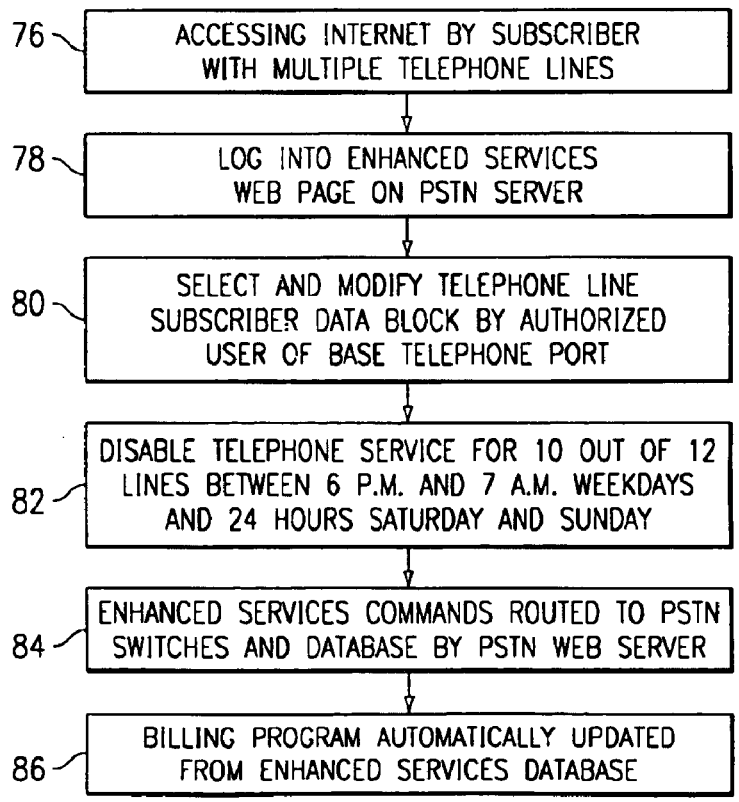

A further example is to provision the use of telephone numbers in FIG. 5. A subscriber may have numerous telephone lines for a business operations during the day, yet only require a main line and fax line during off-hours. The subscriber, by logging into the Internet 76, first logs into the home page for security verification 78. The home page is a Web page maintained by a PSTN server in the local telephone calling region normally serving that subscriber. Once authorized, the subscriber then accesses a link from an enhanced services menu for the specific service of interest. Each link contains selectable entries constituting a form which the subscriber may modify according to date, time, and/or regularly occurring event 80. For example, if the subscriber has a dozen phone lines but only needs two in the evenings and weekends, then a Web page for telephone service is modified to indicate which ten telephone accounts are disabled during the hours of 6 p.m. to 7 a.m. Monday through Friday, and all 24 hours of the day Saturday and Sunday 82. After verifying that the modifications are available and correctly entered, the PSTN operation responsible for delivery of telephone service to the base telephone account monitors switching centers within the local region to disable the selected lines during the specified hours 84. The PSTN benefits by freeing up resources it would normally expend on monitoring the subscribed lines and the subscriber benefits from the PSTN billing program prorating charges for only the times used during working hours by the subscriber 86.

It should be appreciated that the provisioning of services previously discussed can be performed in an alternative exemplary embodiment by actions similar to but simpler than those described above regarding Internet phones. An Internet telephone may have its calls routed through an Internet Telephony server instead of the PSTN. Enhanced services for the Internet phone can be located in a subscriber data block similar to the PSTN system.

This block can be modified and provisioned similar to the PSTN system by the subscriber accessing a home page and modifying enhanced services forms for each service of interest. Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A system for provisioning telephone services, comprising:
    a telephone port connected to a network;
    a telephony service switching system, linked to said network;
    one or more enhanced subscriber services delivered to said telephone port;
    enhanced subscriber services data linked to said telephone service switching system;
    a program, residing on a computer linked to said subscriber services data, for accessing said subscriber services data and changing said enhanced subscriber services based on intermittent use by a subscriber of said enhanced subscriber services, said program changing said enhanced subscriber services data, said changed enhanced subscriber services data causing said telephone service switching system to provision said enhanced subscriber services delivered to said telephone port without unsubscribing said telephone port from said enhanced subscriber services,
    wherein said enhanced subscriber services are billed to said telephone port on a pro-rated basis according to said provision of said enhanced subscriber services.

2. A system for provisioning telephone services by the subscriber to the service according to claim 1, wherein said telephone is connected to a central office of a local PSTN provider.

3. A system for provisioning telephone services by the subscriber to the service according to claim 1, wherein said telephone terminal base port is connected to an Internet telephony service provider.

4. A system for provisioning telephone services by the subscriber to the service according to claim 1, wherein said telephone terminal base port is connected through a private branch exchange (PBX) system.

5. A system for provisioning telephone services by the subscriber to the service according to claim 1, further comprising:
    said program accesses and changes said enhanced subscriber data linked to a matrix switch in said switching system through the Internet;
    said matrix switch receives commands and executes said subscriber's desired configuration for said enhanced services; and
    said matrix switch links to a billing server to record charges for said enhanced services based upon allocation of use from said telephone terminal port.

6. The system of claim 1, wherein said provision of said enhanced subscriber services comprises turning off one of said enhanced subscriber services during one of a day of the week or time of the day without disconnecting said telephone port from said one of said enhanced subscriber services.

7. The system of claim 6, wherein said provision of said enhanced subscriber services comprises billing said telephone port is only for said one of said enhanced subscriber services when said one of said enhanced subscriber services is not turned off.

8. The system of claim 1, wherein said program causes said telephone service switching system to provision said enhanced subscriber services by turning off billing of said enhanced subscriber services without affecting a subscription to said enhanced subscriber services and without affecting said telephone connection to said network.

9. A method for provisioning an enhanced telephone service by the subscriber to the enhanced service comprising:
    providing a telephone connected to a network;
    providing a telephony switching system connected to said network;
    accessing said network through a computer;
    accessing a program on said computer to modify an enhanced subscriber telephone service through said network that is provided to said telephone through said switching system;
    changing said enhanced subscriber service for said telephone on an intermittent basis without unsubscribing said telephone from said enhanced subscriber service; and
    billing on a pro-rated basis for said enhanced subscriber service for said telephone based on time or volume of use according to said intermittent basis.

10. The method of claim 9, wherein said providing a telephony switching system comprises providing said telephone switching system that is connected to a central office of a local PSTN provider.

11. The method of claim 9, wherein said providing a telephony switching system comprises providing said telephone switching system that is connected to an Internet telephony service provider.

12. The method of claim 9, wherein said providing a telephone connected to a network comprises providing a telephone connected to said network through a private branch exchange (PBX) system.

13. The method of claim 9, wherein said accessing a program comprises accessing and changing enhanced subscriber data in said telephony switching system through the Internet, changing said enhanced subscriber service according to said changed enhanced subscriber data; and allocating charges for said enhanced subscriber service only for periods when said enhanced subscriber service is active.

14. The method of claim 9, wherein said changing of said enhanced subscriber service comprises turning off said enhanced subscriber services during one day of a week or during a time period of a day without disconnecting said enhanced subscriber service.

15. The method of claim 9, wherein said billing comprises billing said subscriber for said enhanced subscriber service only when said enhanced subscriber service is not turned off.

16. The method of claim 9, wherein said billing comprises billing of said enhanced subscriber service without affecting a subscription to said enhanced subscriber service and without disconnecting said telephone connection to said network.

17. The method of claim 9, wherein said changing said enhanced subscriber service for said telephone on an intermittent basis comprises provisioning said enhanced subscriber service to turn off billing of said enhanced subscriber service without unsubscribing said telephone from said enhanced subscriber service.

18. A method for provisioning an enhanced telephone service, comprising:

providing a plurality of telephone service subscription lines connected to a network;

providing a telephony switching system, connected to said network, for handling calls routed through said plurality of telephone service subscription lines;

accessing said network through a computer;

accessing a program, on said computer, to modify an enhanced subscriber telephone service through said network that is provided for said telephones through said switching system;

changing said enhanced subscriber service by disabling at least one of said telephone subscription lines on an intermittent basis without disconnecting said one of said telephone subscription lines; and provisionally billing a subscriber of said telephone subscription lines only for time when each of said telephone lines are not disabled.

19. The method of claim 18, wherein said disabling comprises turning off said at least one of said telephone subscription lines during one day of a week or during a time period of a day without disconnecting said telephone subscription line.

20. The method of claim 18, wherein said disabling further comprises turning off one or more enhanced services associated with said disabled telephone subscription line and turning off billing of said one or more enhanced subscriber services without unsubscribing said telephone subscription line from said one or more enhanced subscriber services.

* * * * *